US008837902B2

(12) United States Patent
Martini (10) Patent No.: US 8,837,902 B2
(45) Date of Patent: Sep. 16, 2014

(54) THRESHOLD BASED COMPUTER VIDEO OUTPUT RECORDING APPLICATION

(75) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 356 days.

(21) Appl. No.: 12/481,331

(22) Filed: Jun. 9, 2009

(65) Prior Publication Data

US 2010/0313229 A1   Dec. 9, 2010

(51) Int. Cl.
*H04N 5/775*  (2006.01)
*H04N 5/765*  (2006.01)
*H04N 5/76*   (2006.01)

(52) U.S. Cl.
CPC . *H04N 5/765* (2013.01); *H04N 5/76* (2013.01)
USPC .......................................... 386/230; 386/200

(58) Field of Classification Search
None
See application file for complete search history.

(56) References Cited

U.S. PATENT DOCUMENTS

| 6,907,533 | B2 | 6/2005 | Sorkin et al. | |
| 7,502,797 | B2 | 3/2009 | Schran et al. | |
| 7,996,374 | B1 * | 8/2011 | Jones et al. | 707/694 |
| 2001/0039579 | A1 | 11/2001 | Trcka et al. | |
| 2002/0095601 | A1 | 7/2002 | Hind et al. | |
| 2004/0010720 | A1 | 1/2004 | Singh et al. | |
| 2006/0059557 | A1 | 3/2006 | Markham et al. | |
| 2007/0180101 | A1 * | 8/2007 | Chen et al. | 709/224 |
| 2007/0240214 | A1 | 10/2007 | Berry | |
| 2008/0199155 | A1 * | 8/2008 | Hagens et al. | 386/124 |
| 2008/0301794 | A1 | 12/2008 | Lee | |
| 2009/0064248 | A1 * | 3/2009 | Kwan et al. | 725/109 |
| 2009/0187968 | A1 * | 7/2009 | Roese et al. | 726/1 |
| 2010/0036945 | A1 * | 2/2010 | Allibhoy et al. | 709/224 |

* cited by examiner

*Primary Examiner* — William C Vaughn, Jr.
*Assistant Examiner* — Eileen Adams
(74) *Attorney, Agent, or Firm* — Fish & Richardson P.C.

(57) ABSTRACT

An application that is capable of monitoring Internet or network traffic and performing recordings of computer video output based on network activity thresholds. The recording application is typically not installed on the computer to be recorded but can reside on the computer to be recorded. The application contains a configuration interface that allows a user to set thresholds for certain types of network activity usage. When a threshold is reached, the application will begin a video recording of the computer's video activity which will be stored for later use. The application can be configured to include settings such as the length of the recording. For example, the application is a hardware appliance capable of monitoring web activity and network traffic and can connect to the computer over the network in order to perform the recording. The computer to be recorded can have specific software capable of capturing the video.

17 Claims, 5 Drawing Sheets

Computer Capable of generating and transfering video recording of its video output Recording apparatus performing and storing recording

FIGURE 4

THRESHOLD BASED COMPUTER VIDEO OUTPUT RECORDING APPLICATION

FIELD OF THE INVENTION

The present invention relates to computers and, more particularly, to computers attached to a network capable of having their video output recorded.

BACKGROUND OF THE INVENTION

Internet use has continued to grow at a rapid pace. With this growth, the use of the web has expanded to much more than just web browsing and has allowed many applications to utilize the Internet as well. Unfortunately, the massive expansion of the web has negative consequences as well. There are situations where content on the Internet may be inappropriate. These situations may include Adult oriented material being exposed to children, or use of the Internet against a company's Internet use policy for non-work related activities. Due to the need to block or filter out inappropriate content, web filters have been developed that can be configured to block or monitor inappropriate content based on the environment.

Hardware based web filters are appliances that can be installed on a network to provide web filtering in a centralized place. They also do not require the use of software to be installed on computers on the network making them easier to configure and manage, especially in large environments.

Web filters not only block certain content from reaching a computer on the network, they also log and generate reports based on the activity on the network. This activity report typically contains the computer or user activity including violations to the filtering policy.

A common problem with web filtering and reading the reports is determining the actual user activity that was occurring on the video monitor during the policy violations. The reports will show web site activity as well as violating activity, but it does not provide a visual view of what the user is doing while the violations occur. This can lead to ambiguity because there are many situations where computers make automated requests, such as for advertisements, which are not performed by the user but instead are triggered automatically by applications on the computer. When trying to enforce policy or generate an audit trail, it is often desirable to be able to obtain a recording of the computer's video desktop (including mouse movements) at specific times, especially when policy violations are occurring. It may also be desirable to obtain a computer video desktop recording on other computer activity thresholds as well.

When performing computer video desktop recordings, a user typically has to start and stop the recording. This is very disadvantageous as it requires the administrator to determine when the recording should be started and should be stopped. This can be nearly impossible as an administrator may not know when the best time of interest is to start the recording as they would like the recording to start when a threshold of a specific type of activity on the monitored computer has been reached. In addition, this would require the administrator wishing to obtain a recording to sit and monitor the computer via a web filter report log (if available) or physically view the monitor to determine that a recording of the computer's video output is necessary. This can be very tedious and time consuming and in some cases impossible.

The ability to obtain and store video recording's of a computer's desktop based on the computer user's activity on the Internet is a great tool for auditing and tracking actual computer use.

Currently there are software solutions capable of recording a computer's video desktop. In addition, software, such as VNC, can record a desktop over a network connection.

Current solutions can record a computer's video desktop manually by clicking on "start" and "stop" buttons. However, this requires manual user intervention and makes it very difficult to capture relevent video of computer usage as the person triggering the recording must know when to start and stop the recording. This is also very time consuming and not practical in many situations especially for the purpose of web content filtering as the person capturing the video would need to know when to start the recording based on the monitored user's computer or Internet usage. In cases where an administrator would like to record a desktop based on certain actions occurring on a computer, such as opening a program, it is very unpractical as the administrator would need to be in viewing distance of the computer and observe all actions in order to determine a video recording is necessary.

It would be advantageous to provide a recording of a computer's video output.

It would also be advantageous to provide a recording of computer's video output triggered when a specific threshold of activity is reached.

It would also be advantageous to provide a recording of computer's video output triggered when a specific threshold of computer generated network activity is reached.

It would also be advantageous to provide a recording of computer's video output triggered when a specific threshold of computer usage activity is reached.

It would also be advantageous to provide a recording of a computer's video output remotely via a network connection.

It would also be advantageous to provide a recording of a computer's video output by receiving the video stream from tools capable of capturing video output that are currently installed on the monitored computer, such as VNC.

It would also be advantageous to store video recordings captured from a computer's video output for later viewing.

It would also be advantageous to centrally manage recordings of computers' video on a network with many computers.

It would also be advantageous to configure settings of preferences for when to automatically start the recording, stop the recording, and how long to perform the recording.

It would also be advantageous to monitor network traffic in order to trigger video recordings from existing network equipment such as switches, routers and Internet web filters.

It would further be advantageous to allow a web filter to automatically handle performing, storing, and displaying video recordings.

SUMMARY OF THE INVENTION

In accordance with the present invention, there is provided a network recording application that is capable of monitoring Internet or network traffic and performing recordings of computer video output based on network activity thresholds. The recording application is typically not installed on the computer to be recorded but can reside on the computer to be recorded. The application contains a configuration interface that allows a user to set thresholds for certain types of network activity usage. When a threshold is reached, the application will begin a video recording of the computer's video activity which will be stored for later use. The application can be configured to include settings such as the length of the recording. In a typical environment, the application is a hardware appliance that is capable of monitoring web activity and network traffic and can connect to the computer over the network in order to perform the recording. The computer to be recorded can have specific software that is capable of capturing the video or can use industry standard video capturing software such as VNC. VNC is typically used to view and control computers as well as send video images of the computer and the application can utilize an existing application such as this to perform the recording over the network. The recording application can integrate with software tools such as VNC and does not require specifically developed proprietary software to be installed on the monitored computer in order to perform a recording of the computer's video output.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 2:
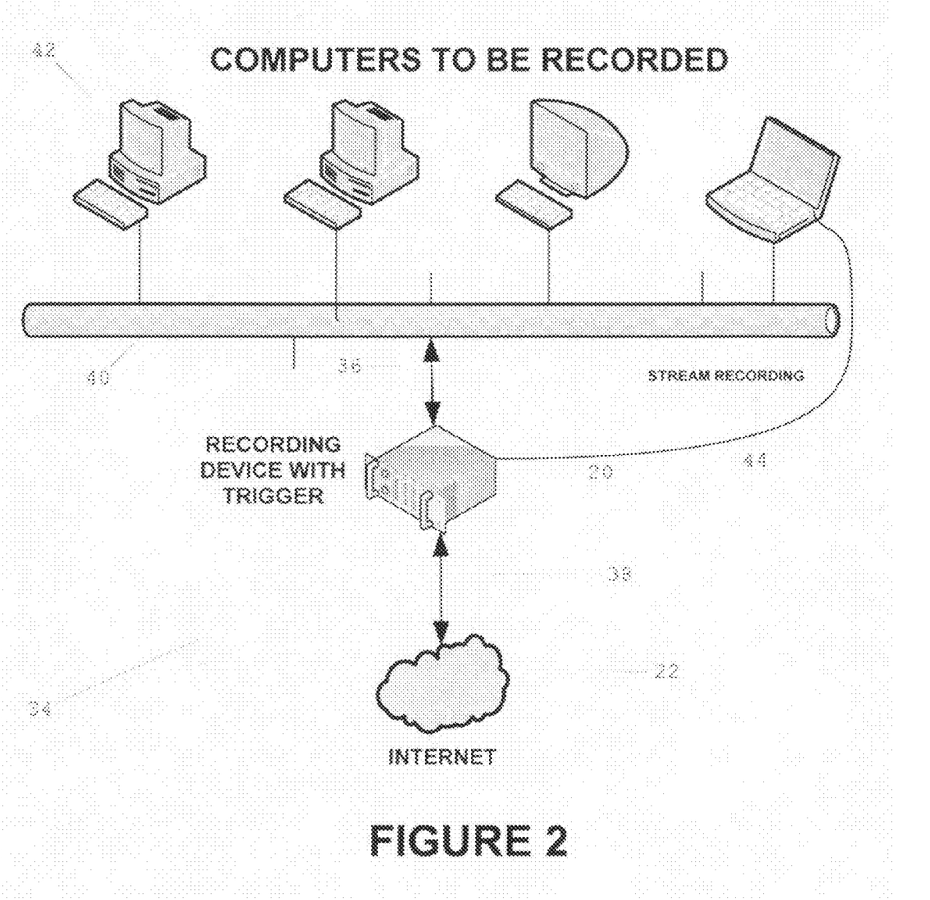
FIG. 2 is a perspective view of a threshold based video desktop recording system and interaction of components of the system.

Referring to FIG. 2 an automatic threshold based video desktop recording system consists of an entire system 34 located on a computer network. The entire system 34 consists of monitored computers 42 connected to a network connection 40. The monitored computers 42 can consist of personal computers or workstations, but can be any other terminal that is capable of generating network traffic and can be attached to a network connection 40 or a device capable of having its video output recorded. The network connection 40 can consist of an Ethernet network, but can also be any other type of network capable of carrying network traffic such as Fiber Channel, ATM, ITU-T, and G.hn. The monitored computers 42 can be connected to a local area network, but can also be part of any type of network configuration including a personal area network, campus area network, metropolitan area network, wide area network, global area network, virtual private network, internetwork, intranet, extranet or the Internet 22. In this case they are connected to a local area network. The network connection 40 is connected to a recording application 20 capable of monitoring traffic between the Internet 22 and the monitored computers 42. The recording application 20 in the diagram is a hardware appliance, but can consist of a software system which is installed on another network appliance such as a router or a switch 52. The recording apparatus is capable of containing activity thresholds that it can use to determine when to start an automatic recording.

Within the entire system 34, the major data interactions are:

36: Transmission of local monitored data 36 to and from the monitored computers 42 through the monitoring and recording application 20. This data is monitored by the recording application 20 and compared against activity thresholds. The activity thresholds are preconfigured by a network administrator, but can be self adjusting and dynamically adjusted by the monitor itself based on network activity.

20: The recording application 20 monitors incoming and outgoing data from the monitored computers 42 and begins a recording if the type of network activity matches the configured criteria and threshold level. If a threshold is reached, the recording application 20 opens a video recording stream 44 with the computer from the monitored computers 42 that reached its activity threshold.

38: Internet monitored data 38 enters the recording application 20 from the Internet 22 and can also be compared against activity thresholds and contribute toward the activity threshold being reached. The data entering from the Internet 22 is associated with one of the monitored computers 42 by associating network attributes such as source and destination address of the data. This data can also contribute to the overall activity trigger threshold 10 and can trigger a recording to begin between the recording application 20 and the computer from the group of monitored computers 42.

Figure 4:
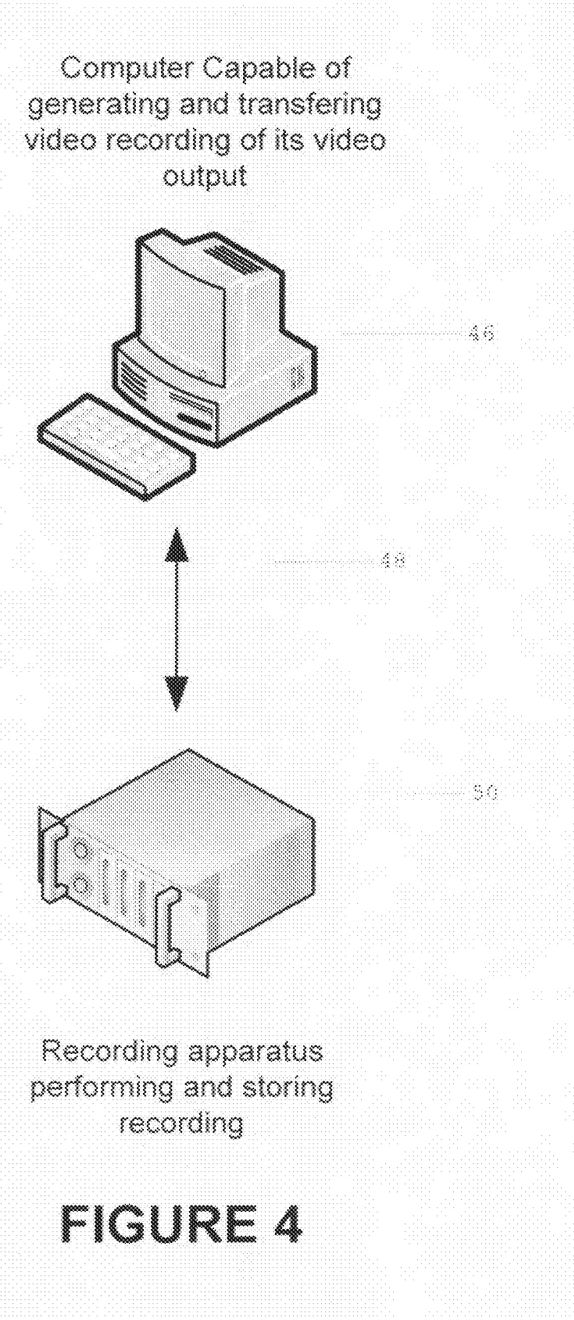
FIG. 4 is a perspective view of an illustration of interaction between recording application and computer whose video monitor output is being recorded.

Referring to FIG. 4 in more detail, the computer generating recording 46 is indicated to start the recording by apparatus storing recording 50. The computer generating recording 46 must be capable of capturing its video output (typically this is the video seen on the monitor attached to the computer being recorded). This can be accomplished by a variety of techniques. The operating system running on the computer generating recording 46 can have this feature built in. Another technique would involve providing proprietary software to be installed on computer performing recording so that the software can perform the recording process and transfer the video data 48 to the apparatus storing recording 50. However, a very good way of generating the recording is to use software tools that are capable of performing desktop video capture and are commonly in use in the field. For example, Virtual Network Computing, commonly referred to as VNC, is a common software tool used to capture video data 48 from computer and transfer the video over a network to a remote system. The apparatus storing recording 50 should be capable of interacting with existing software systems, such as VNC, so that current network infrastructure can be utilized. Using VNC also reduces the overhead of configuring the system as VNC may already be installed on the monitored computers 42. In this example, the apparatus storing recording 50 will interact with the VNC software that is installed on the computer generating recording 46. The apparatus storing recording 50 will indicate to the installed VNC software on the computer generating recording 46 the start of recording 30 and transfer video data 48 to the apparatus storing recording 50.

Referring to the apparatus storing recording 50 in FIG. 4 in more detail, the apparatus storing recording 50 is capable of communicating over a network via the protocol offered on the computer generating recording 46. The apparatus storing recording 50 can be a dedicated hardware appliance for this purpose, can be integrated within a hardware appliance with other primary purposes such as an Internet 22 Web Filter, a switch 52, a gateway, or a router. The important aspect is that it is able to monitor the network data in order to determine if activity warrants a recording between the apparatus performing recording and the computer generating recording 46 is necessary.

Figure 5:
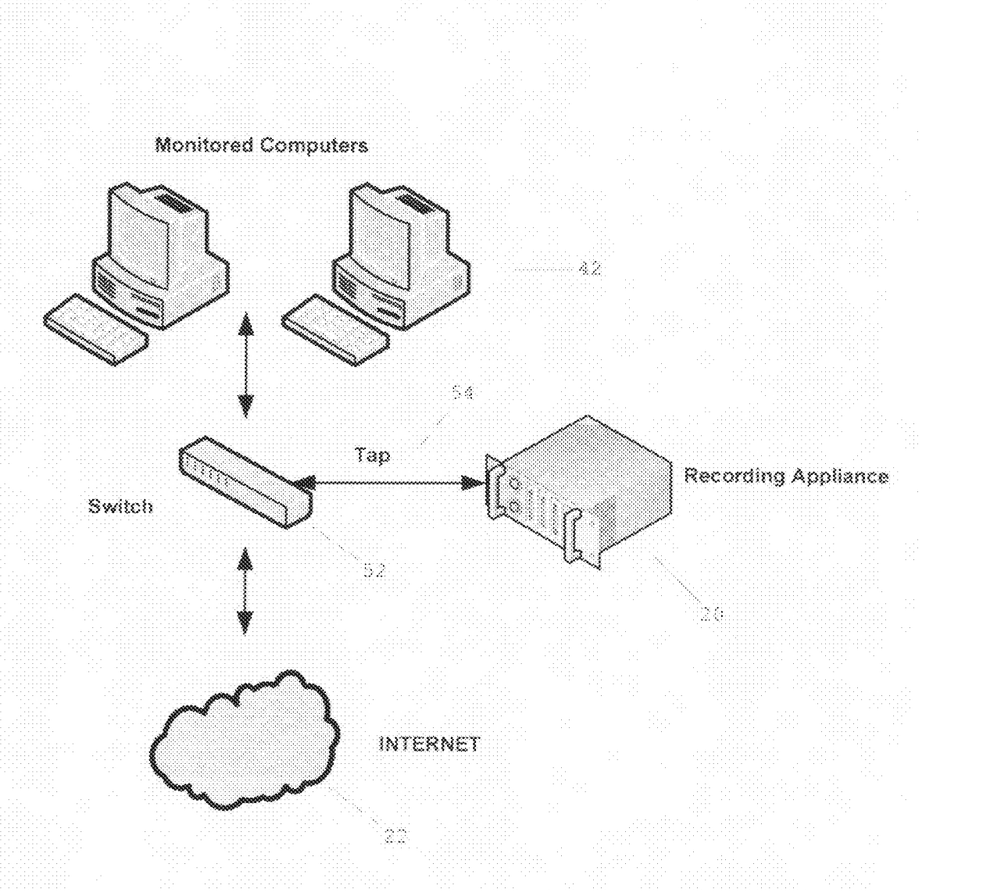
FIG. 5 is a perspective view of an illustration of recording application configured to use a network tap instead of being placed inline with the data path.

The recording application 20 does not need to be inline with the data path. It can be attached to a network via a Tap, which mirrors data running through another device, such as a switch 52, to another port for the purpose of monitoring.

Network taps are a common way of monitoring traffic on a network. without having to place a hardware appliance inline of the data path. This allows the recording application 20 to monitor the traffic and determine when a recording is necessary. This eliminates the recording application 20 from being a point of failure on a network but can still monitor network activity to determine if a computer desktop recording is necessary and perform the recording. Referring to FIG. 5 in more detail which illustrates the recording application 20 in network tap 54 configuration, the monitored computers 42 run data to and from the Internet 22 through the switch 52. The switch 52 mirrors data travelling between the monitored computers 42 and Internet 22 onto the network tap 54 which is delivered to the recording application 20. The recording application 20 evaluates the data based on network use activity and its thresholds and performs a recording to one of the monitored computers 42 if necessary.

Figure 3:
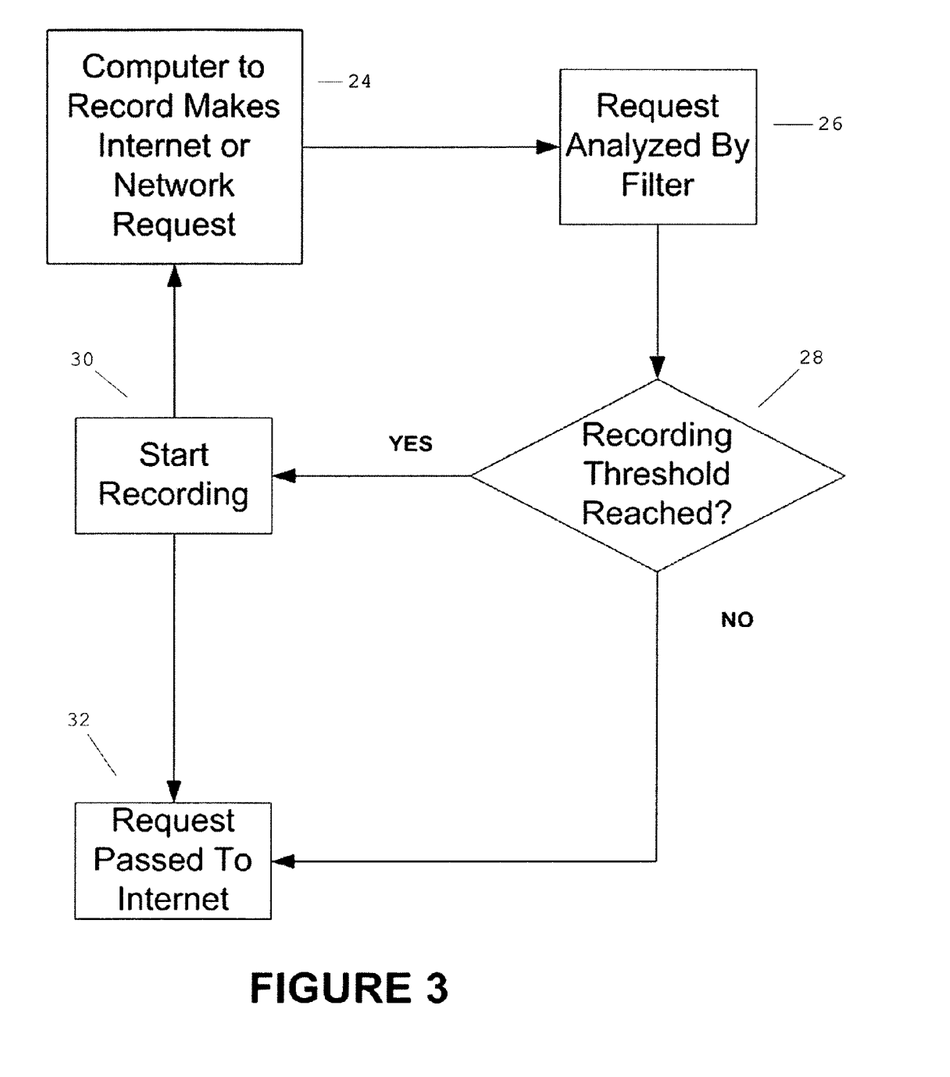
FIG. 3 is a perspective view of a diagram illustrating the threshold based video desktop recording system in more detail.

FIG. 3 shows a flow diagram describing the threshold based video recording process. In this scenario, the diagram shows an example of one of the monitored computers 42 making a network request 24 that will trigger a video desktop recording to occur. The computer makes a network request 24 which begins the process. The request is typically sent to the Internet 22 by the computer. The recording application 20 begins an analysis of request against threshold activity 26 to determine if a recording should be started. The threshold settings can include different types of activity including visiting particular websites, visiting website categories, or accessing a network enabled program. There are many other network activity types that can trigger a video recording. If the recording threshold is reached 28, the recording application 20 will indicate the start of recording 30 by initiating the application on the monitored computer capable of video recording to begin sending the computer's video stream over the network to the recording application 20. If the recording threshold has not been reached but contains activity that will contribute toward reaching the threshold, a counter is incremented which contributes toward the recording threshold. The request continues through the network 32 regardless of whether a recording was started or not. This can be configurable, however and the request may be dropped depending on configuration. Also note that activity can be monitored entering from the Internet 22 to the monitored computers 42.

It is noted that the activity that contributes toward the threshold to start a recording is not limited to network activity. Activity contributing the recording threshold can result from those activities performed locally on a computer. For example, activities such as opening particular programs or performing certain actions on a computer can be included toward the recording threshold that trigger a recording.

The recording threshold is configured by selecting certain types of network activity which will count toward a threshold match. Typically, different types of activity are used to describe activities that match a threshold. For example, an activity match might be the act of visiting a shopping related website. Whenever a computer that is being monitored accesses a shopping related website on the Internet 22, this will contribute toward a threshold match. Thresholds are configured by setting the number of matches that must occur within a certain period of time before a recording is performed. There may be other criteria that can be added that can occur within a particular time interval to trigger a desktop recording. In addition, thresholds do not need to be time or interval based. A threshold may be configured that indicates a total number of matches to the selected criteria.

Figure 1:
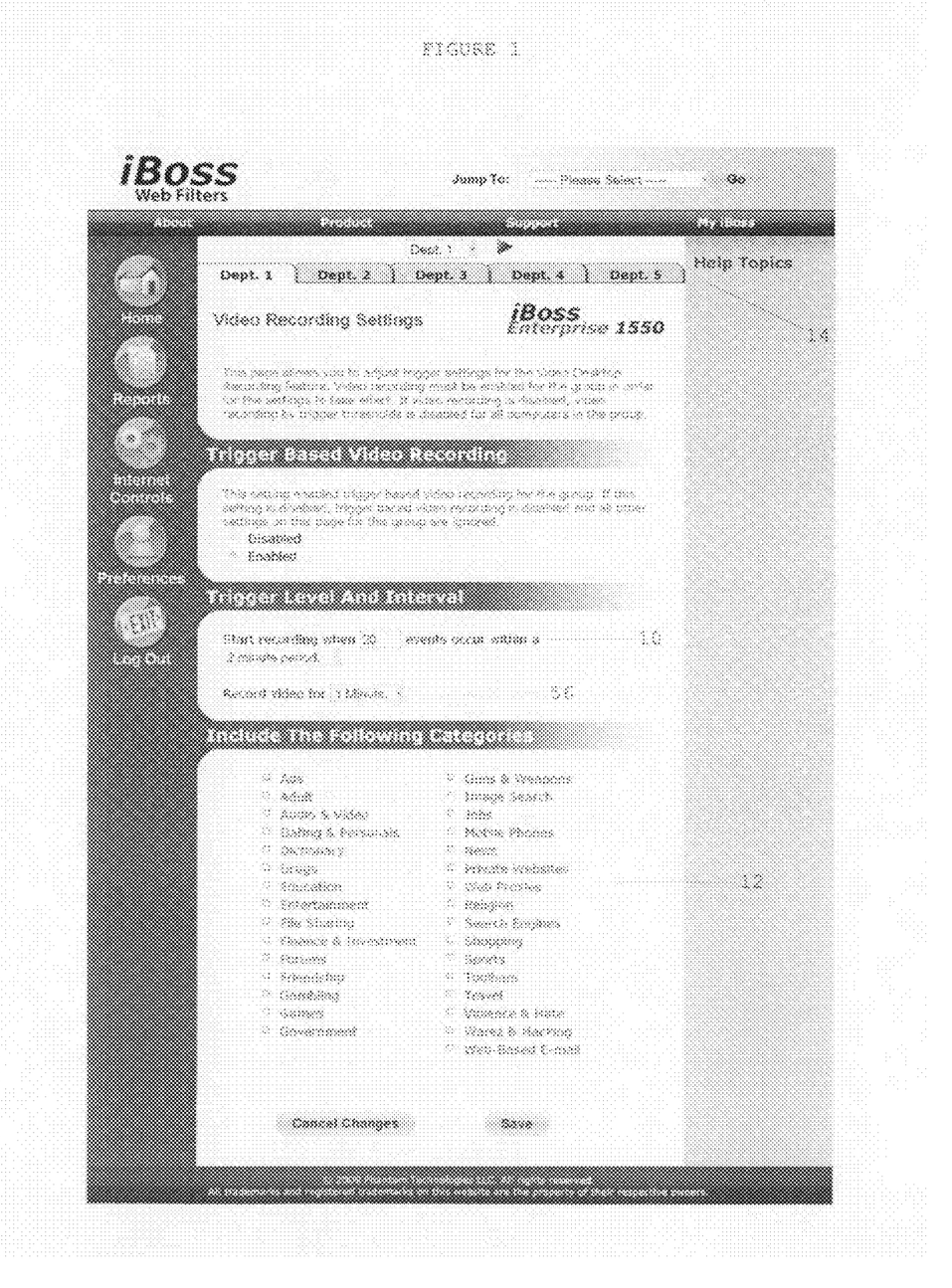
FIG. 1 is a perspective view of a diagram illustrating recording threshold settings in accordance with the invention.

FIG. 1 shows an example of the types of settings that might used to configure the trigger settings. A start of recording 30 trigger threshold 10 is configured by specifying the number of matching events that must occur within a configurable amount of time before a recording is started. In this case, the user has configured that a total of 20 matching events must occur within a 2 minute period before a recording is triggered to occur. The user can also configure settings such as the recording length 56 so that the recording application 20 can perform recordings for a particular amount of time once the threshold has been reached. The user can also configure what types of activity contribute toward the trigger threshold 10 by selecting the types of activities, such as the trigger activity settings 12 shown. In this case, the user selects categories of web browsing activity that contribute toward the recording threshold. For example, web browsing requests may be categorized into specific categories depending on the type of content on the website. Whenever the recording apparatus detects a request for a website within the selected category, it increments the number of events that have occurred within the threshold interval. If the number of events that have occurred exceed the amount set in the threshold settings, a recording begins. Threshold settings can also be categorized into groups. The group settings 14 found toward the top of the illustration allow different settings to be applied to different computer groupings. Monitored computers 42 can be associated with the groups so that different thresholds can apply to different computers. Assigning monitored computers 42 to groups can be performed by many methods such as by using the computer's IP Address, using the computer's MAC address, or based on the currently logged in user of the computer.

Currently, recording computer video output over the network exists. Programs such as VNC allow users to manually start recordings. However, this is very tedious and a manual process. Triggering recordings based on computer activity allows this process to be automated free of user intervention. In addition, there are many cases where a network administrator would like to perform a recording of a computer's desktop while certain types of Internet 22 activity are occurring. For example, this is very desirable in the case of Internet 22 web filtering where filters are used to block users from accessing particular content on the Internet 22. In certain cases, an administrator would like the recording to occur while the user is attempting to access Internet 22 resources that have been restricted or are of interest to the administrator. Having to perform a manual recording in these cases is nearly impossible as the administrator would have to physically and manually monitor the activity on the computer's monitor and select the record button when the activity in question is being performed. Having to physically or manually monitor the computer's video desktop is not only inefficient but may cause a problem as the activity on the computer is not likely to occur if the user of the computer notices that the computer is being monitored by the administrator. Having automatic thresholds ensures transparent and seamless monitoring and recording without any user intervention.

The video recordings are stored on the recording apparatus for later viewing. The format for the stored recordings can vary in format. Portable formats can be convenient so that they can be viewed via a browser interface. For example, an administrator can later log into the recording application 20 through a web browser interface and click on the recorded video desktops to view them. Alternatively, the recordings can be viewed in other applications and can be presented by the recording application 20 for download so that they can be stored locally on the user computer.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method comprising:
    establishing, by a data processing apparatus that includes electronic circuitry, a network communication with a computing device, wherein the computing device is coupled to the Web and comprises a display device configured to present computer-video-output generated by the computing device;
    obtaining, by the data processing apparatus, a Web filter policy and a recording interval, wherein the Web filter policy comprises one or more types of Web traffic generated over a predetermined time, wherein the Web traffic comprises sending requests to and receiving respective responses from the Web, and receiving requests from and sending respective responses to the Web, wherein detection through the established network communication by the data processing apparatus of a violation of the Web filter policy by the computing device causes the data processing apparatus to instruct through the established network communication the computing device to record the computer-video-output generated by the computing device over the recording interval, wherein computer-video-output to be recorded includes at least some computer-video-output that violates the Web filter policy;
    monitoring, by the data processing apparatus through the established network communication, the Web filter policy at the computing device;
    detecting, by the data processing apparatus through the established network communication and based on the monitoring, a violation of the Web filter policy at the computing device;
    in response to detecting the violation of the Web filter policy at the computing device, instructing the computer device, by the data processing apparatus through the established network communication, to record the computer-video-output generated by the computing device over the recording interval, wherein the recorded computer-video-output includes at least some computer-video-output that violates the Web filter policy; and
    issuing, by the data processing apparatus, an instruction to store the recorded computer-video-output that includes the at least some computer-video-output that violates the Web filter policy to a storage device.

2. The method of claim 1, wherein
    the storage device where the recorded computer-video-output that includes the at least some computer-video-output that violates the Web filter policy is stored is local to the computing device, and
    the instruction to store is issued by the data processing apparatus through the established network communication to the computing device and specifies storing the recorded computer-video-output that includes the at least some computer-video-output that violates the Web filter policy to the storage device local to the computing device.

3. The method of claim 1, wherein
    the storage device where the recorded computer-video-output that includes the at least some computer-video-output that violates the Web filter policy is stored is local to the data processing apparatus,
    the method further comprises instructing the computing device by the data processing apparatus to stream the recorded computer-video-output that includes the at least some computer-video-output that violates the Web filter policy to the data processing apparatus, and
    the instruction to store is issued by the data processing apparatus to itself and specifies storing the streamed computer-video-output to the storage device local to the data processing apparatus.

4. The method of claim 1, wherein the Web filter policy comprises
    a first Web filter policy corresponding to a first category of users associated with the computing device, wherein the first Web filter policy comprises a first type of Web traffic generated over a first predetermined time, and
    a second, different Web filter policy corresponding to a second category of users associated with the computing device, wherein the second Web filter policy comprises a second type of Web traffic generated over a second predetermined time.

5. The method of claim 1, wherein at least one of the Web filter policy and the recording interval are obtained through user input.

6. The method of claim 1, wherein the recorded computer-video-output that includes the at least some computer-video-output that violates the Web filter policy comprises video desktop recording.

7. The method of claim 1, wherein the computing device is one of a mobile telecommunication device, a tablet computer, a laptop and a desktop.

8. The method of claim 1, wherein the computing device comprises the data processing apparatus.

9. The method of claim 1, wherein the computing device comprises the data processing apparatus.

10. An apparatus comprising:
    one or more hardware processors communicatively coupled with a computing device, wherein the computing device is coupled to the Web and comprises a display device configured to present computer-video-output generated by the computing device; and
    non-transitory computer-readable media encoding instructions that, when executed by the one or more hardware processors, cause the apparatus to perform operations comprising:
        obtain a Web filter policy and a recording interval, wherein the Web filter policy comprises one or more types of Web traffic generated over a predetermined time, wherein the Web traffic comprises sending requests to and receiving respective responses from the Web, and receiving requests from and sending respective responses to the Web, wherein detection through the established network communication by the data processing apparatus of a violation of the Web filter policy by the computing device causes the apparatus to instruct through the established network communication the computing device to record the computer-video-output generated by the computing device over the recording interval, wherein computer-video-output to be recorded includes at least some computer-video-output that violates the Web filter policy,
        monitor the Web filter policy at the computing device,
        detect, through the established network communication and based on the monitor, a violation of the Web filter policy at the computing device, once the violation of the Web filter policy is detected at the computing device, instruct the computer device to record the computer-video-output generated by the computing device over the recording interval, wherein the recorded computer-video-output includes at least some computer-video-output that violates the Web filter policy, and issue an instruction to store the recorded computer-video-output that includes the at least some computer-video-output that violates the Web filter policy to a storage device.

11. The apparatus of claim 10, wherein
the storage device where the recorded computer-video-output that includes the at least some computer-video-output that violates the Web filter policy is stored is local to the computing device, and
the instruction to store is issued to the computing device and specifies storing the recorded computer-video-output that includes the at least some computer-video-output that violates the Web filter policy to the storage device local to the computing device.

12. The apparatus of claim 10, wherein
the storage device where the recorded computer-video-output that includes the at least some computer-video-output that violates the Web filter policy is stored is local to the apparatus,
the operations further comprise
instruct the computing device to stream the recorded computer-video-output that includes the at least some computer-video-output that violates the Web filter policy to the apparatus, and
the instruction to store is issued to itself and specifies storing the streamed computer-video-output to the storage device local to the apparatus.

13. The apparatus of claim 10, wherein the Web filter policy comprises
a first Web filter policy corresponding to a first category of users associated with the computing device, wherein the first Web filter policy comprises a first type of Web traffic generated over a first predetermined time, and
a second, different Web filter policy corresponding to a second category of users associated with the computing device, wherein the second Web filter policy comprises a second type of Web traffic generated over a second predetermined time.

14. The apparatus of claim 10, wherein at least one of the Web filter policy and the recording interval are obtained through user input.

15. The apparatus of claim 10, wherein the recorded computer-video-output that includes the at least some computer-video-output that violates the Web filter policy comprises video desktop recording.

16. The apparatus of claim 10, wherein the computing device is one of a mobile telecommunication device, a tablet computer, a laptop and a desktop.

17. The apparatus of claim 10, wherein the computing device comprises the apparatus.

* * * * *